(12) United States Patent
Sato et al.

(10) Patent No.: US 7,775,923 B2
(45) Date of Patent: Aug. 17, 2010

(54) CHAIN TENSIONER FOR TWO-WHEELED VEHICLE ENGINE

(75) Inventors: Seiji Sato, Iwata (JP); Satoshi Kitano, Iwata (JP); Hisashi Hayakawa, Iwata (JP)

(73) Assignee: NTN Corporation, Osaka (JP)

( * ) Notice: Subject to any disclaimer, the term of this patent is extended or adjusted under 35 U.S.C. 154(b) by 820 days.

(21) Appl. No.: 11/167,141

(22) Filed: Jun. 28, 2005

(65) Prior Publication Data

US 2006/0003859 A1 Jan. 5, 2006

(30) Foreign Application Priority Data

Jul. 1, 2004 (JP) .............................. 2004-195371

(51) Int. Cl.
*F16H 7/08* (2006.01)
(52) U.S. Cl. ........................ 474/110; 474/138; 474/109
(58) Field of Classification Search ................. 474/101, 474/109.11, 111, 135, 110, 136, 138
See application file for complete search history.

(56) References Cited

U.S. PATENT DOCUMENTS

| | | | | | |
|---|---|---|---|---|---|
| 4,708,696 | A | * | 11/1987 | Kimura et al. ............... | 474/103 |
| 4,863,417 | A | * | 9/1989 | Kimata et al. ............... | 474/101 |
| 5,030,169 | A | * | 7/1991 | Kiso et al. ................... | 474/110 |
| 5,713,809 | A | * | 2/1998 | Yamamoto et al. .......... | 474/110 |
| 5,967,923 | A | * | 10/1999 | Petri ........................... | 474/138 |
| 6,203,461 | B1 | * | 3/2001 | Watanabe et al. ........... | 474/110 |
| 6,609,987 | B1 | * | 8/2003 | Beardmore ................... | 474/111 |
| 7,037,229 | B2 | * | 5/2006 | Hayakawa et al. .......... | 474/110 |
| 2002/0052259 | A1 | * | 5/2002 | Nakakubo et al. ........... | 474/109 |
| 2003/0139235 | A1 | * | 7/2003 | Yamamoto et al. .......... | 474/109 |
| 2004/0092350 | A1 | * | 5/2004 | Hashimoto et al. .......... | 474/110 |
| 2004/0266571 | A1 | * | 12/2004 | Izutsu et al. ................. | 474/110 |

(Continued)

FOREIGN PATENT DOCUMENTS

JP 2001-032896 2/2001

(Continued)

OTHER PUBLICATIONS

Japanese Office Action issued Jan. 5, 2010 (with English translation) in a Japanese application that is a foreign counterpart to the present application.

*Primary Examiner*—Bradley T King
*Assistant Examiner*—Thomas Irvin
(74) *Attorney, Agent, or Firm*—Wenderoth, Lind & Ponack, LLP.

(57) ABSTRACT

A chain tensioner for use with a chain of a vehicle engine, includes a housing and a plunger slidably mounted in a cylinder chamber formed in the housing. The plunger is biased outwardly by a return spring mounted in a pressure chamber defined in the cylinder chamber by the plunger. A check valve is provided in the cylinder chamber to prevent backflow of hydraulic oil in the pressure chamber. A relief valve, provided in the plunger, opens above a relief pressure, thereby discharging hydraulic oil in the pressure chamber. An oil leakage clearance is defined between the plunger and the inner wall of the cylinder chamber. The relief pressure and the oil leakage clearance dimension are determined such that the tension in the chain is kept at such a level that vibrations of the chain are minimum at any temperature of hydraulic oil and at any engine revolution speed.

3 Claims, 6 Drawing Sheets

U.S. PATENT DOCUMENTS

2006/0116229 A1 * 6/2006 Sato et al. .................. 474/110
2008/0280711 A1 * 11/2008 Sato et al. .................. 474/110
2008/0280712 A1 * 11/2008 Ryouno et al. ............. 474/110

FOREIGN PATENT DOCUMENTS

| | | |
|---|---|---|
| JP | 2001-165251 | 6/2001 |
| JP | 2002188697 A * | 7/2002 |
| JP | 2003278857 A * | 10/2003 |
| JP | 2003-329091 | 11/2003 |
| JP | 2004-176821 | 6/2004 |

* cited by examiner

CHAIN TENSIONER FOR TWO-WHEELED VEHICLE ENGINE

BACKGROUND OF THE INVENTION

The present invention relates to a chain tensioner for use in a chain system for driving camshafts of a vehicle engine, particularly a vehicle engine that rotates at a high speed such as a two-wheeled vehicle engine.

A chain tensioner is used in a chain system for driving camshafts of a vehicle engine, and typically comprises a housing formed with a cylinder chamber, a plunger slidably mounted in the cylinder chamber of the housing, thereby defining a pressure chamber in the cylinder chamber, and a spring mounted in the pressure chamber to bias the plunger outwardly of the cylinder chamber. The housing is formed with a hydraulic oil supply passage communicating with the pressure chamber. The plunger has its protruding end pressed against a camshaft-driving chain. Hydraulic oil in the pressure chamber dampens the pushing force applied from the chain to the plunger, thereby keeping the tension in the chain at a constant level. As the hydraulic oil, engine oil may be supplied into the tensioner.

The applicant has proposed in JP patent publication 2004-176821 a chain tensioner including a relief valve for discharging hydraulic oil in the tensioner if the internal hydraulic pressure exceeds a predetermined level, thereby stabilizing the damping function of the tensioner. The relief valve includes a valve hole and a discharge hole, and is mounted in a stepped hole formed in an oil discharge passage communicating with the pressure chamber.

JP patent publication 2001-32896 discloses a tensioner for a camshaft driving chain or timing belt for use in a two-wheeled or four-wheeled vehicle. This tensioner includes a first shaft and a second shaft having external and internal threads, respectively, that are in threaded engagement with each other and slidably supported on bearings. The spring rotates the first shaft. When the first shaft rotates, the second shaft moves axially, thus applying tension to the chain or belt. A film comprising a solid lubricant is formed between the internal and external threads, and between the first and second shafts and the respective bearings so as to reduce frictional resistance between the first and second shafts and between the first and second shafts and the respective bearings.

Today's engines for two-wheeled vehicles are rotated at higher speed and produce higher horsepower. As a result, conventional chain tensioners cannot sufficiently suppress high-frequency vibrations of the chain used in such an engine, and/or cannot maintain the tension in the chain to an optimum level in a wide revolving speed range of the engine. Various improvements have been proposed including those disclosed in the above-referenced patent publications. But even such improved chain tensioners cannot still maintain the tension in the chain used in a two-wheeled vehicle engine to an optimum level in a wide temperature range and a wide engine revolution range because the revolution range of a two-wheeled vehicle engine is wide.

For example, if the damping force is determined at a low level while the engine is rotating at a high speed in order to reduce the tension in the chain, the damping force may be insufficient while the hydraulic oil temperature is high due to low viscosity of the oil. Conversely, if the damping force is set at a high level, the damping force may be too large when the oil temperature is low and thus high in viscosity. In JP patent publication 2004-176821, if the internal pressure exceeds a predetermined value, the relief valve opens, thus discharging hydraulic oil in the pressure chamber. The chain tensioner can thus stably perform the damping function. But the relief valve alone cannot sufficiently control the tension in the chain used for a two-wheeled vehicle engine.

This is because a two-wheeled vehicle engine has a wide engine revolution range, so that it is necessary to control the tension in the belt even after the engine revolution has exceeded a point at which the tension in the chain is maximum. For this purpose, it is necessary to keep the reaction force produced in the chain tensioner from rising after the relief valve has opened. But if the vibration frequency is high after the relief valve has opened, the pressure in the pressure chamber may increase in spite of the fact that hydraulic oil is being discharged through the relief valve. In order to prevent such a pressure rise after the relief valve has opened, it would be possible to increase the flow rate of hydraulic oil discharged through the relief valve and/or to reduce the pressure at which the relief valve opens. But such a solution may cause a sharp drop in the internal pressure immediately after the relief valve has opened especially if the oil temperature is high and thus its viscosity is low. This will cause flapping of the chain.

In JP patent publication 2001-32896, the frictional resistance produced at the metallic slide contact portions serves as a damper. It is difficult to stably keep such frictional resistance. In order to prevent such frictional resistance from decreasing due to deterioration at the slide contact portions, a film of a solid lubricant is formed at the slide contact portions. This solution is however expensive, and still such a film cannot stabilize the operation of the chain tensioner for a sufficiently long period of time if such a tensioner is used for a camshaft driving chain of a two-wheeled vehicle engine.

An object of the present invention is to provide a chain tensioner especially suitable for use in a chain system for driving cams of a two-wheeled vehicle engine, which can keep the tension in the chain to such a level that the vibration of the chain is minimum at any temperature of the hydraulic oil and at any revolution speed of the engine.

SUMMARY OF THE INVENTION

According to the present invention, there is provided a chain tensioner comprising a housing having an open front end and a radially inner surface defining a cylinder chamber, a plunger having a radially outer surface and slidably mounted in the cylinder chamber, thereby defining a pressure chamber in the cylinder chamber, the radially inner surface and the radially outer surface defining a clearance therebetween through which hydraulic oil in the pressure chamber can leak, a spring biasing the plunger outwardly of the cylinder chamber, the housing being formed with a hydraulic oil supply passage communicating with the pressure chamber, a check valve for preventing backflow of hydraulic oil in the pressure chamber into the hydraulic oil supply passage, and a relief valve for discharging hydraulic oil in the pressure chamber into an oil discharge passage leading to outside when the pressure of hydraulic oil in the pressure chamber exceeds a predetermined relief pressure, the relief pressure and a radial dimension of the clearance are determined with reference to each other such that the tension in a chain against which one end of the plunger protruding from the cylinder chamber is pressed is kept at such a level that vibrations of the chain are minimum at any temperature of hydraulic oil and at any revolving speed of an engine by which the chain is driven.

With this arrangement, when the chain slackens, the plunger is pushed outward by the spring, thereby increasing the tension in the chain. When the tension in the chain increases, the plunger will be pushed into the housing, allowing hydraulic oil in the pressure chamber to gradually leak through the oil leakage clearance. The tension in the chain thus decreases gradually. The tension in the chain is thus kept substantially constant. By setting the relief pressure and a radial dimension of the clearance to optimum values, the tension in the chain can be kept at such a level that vibrations of the chain are minimum at any temperature of hydraulic oil and at any revolving speed of the engine even if the engine is a two-wheeled vehicle engine. If it is impossible to control the tension in the chain to an optimum level simply by independently determining the relief pressure and the radial dimension of the oil leakage clearance, these two parameters are determined with reference to each other. Specifically, they may be determined within the following ranges:

(1) Relief pressure: 0.3 to 1.5 MPa (preferably 0.4 to 1.0 MPa)

(2) Radial dimension of the oil leakage clearance: 0.03 to 0.12 mm (preferably 0.05 to 0.09 mm).

Preferably, the distance by which the check ball of the check valve is movable is restricted by a check ball movement restrictor to 0.1 to 0.6 mm (more preferably 0.2 to 0.5 mm)

BRIEF DESCRIPTION OF THE DRAWINGS

Other features and objects of the present invention will become apparent from the following description made with reference to the accompanying drawings, in which.

DESCRIPTION OF THE PREFERRED EMBODIMENTS

Figure 1:
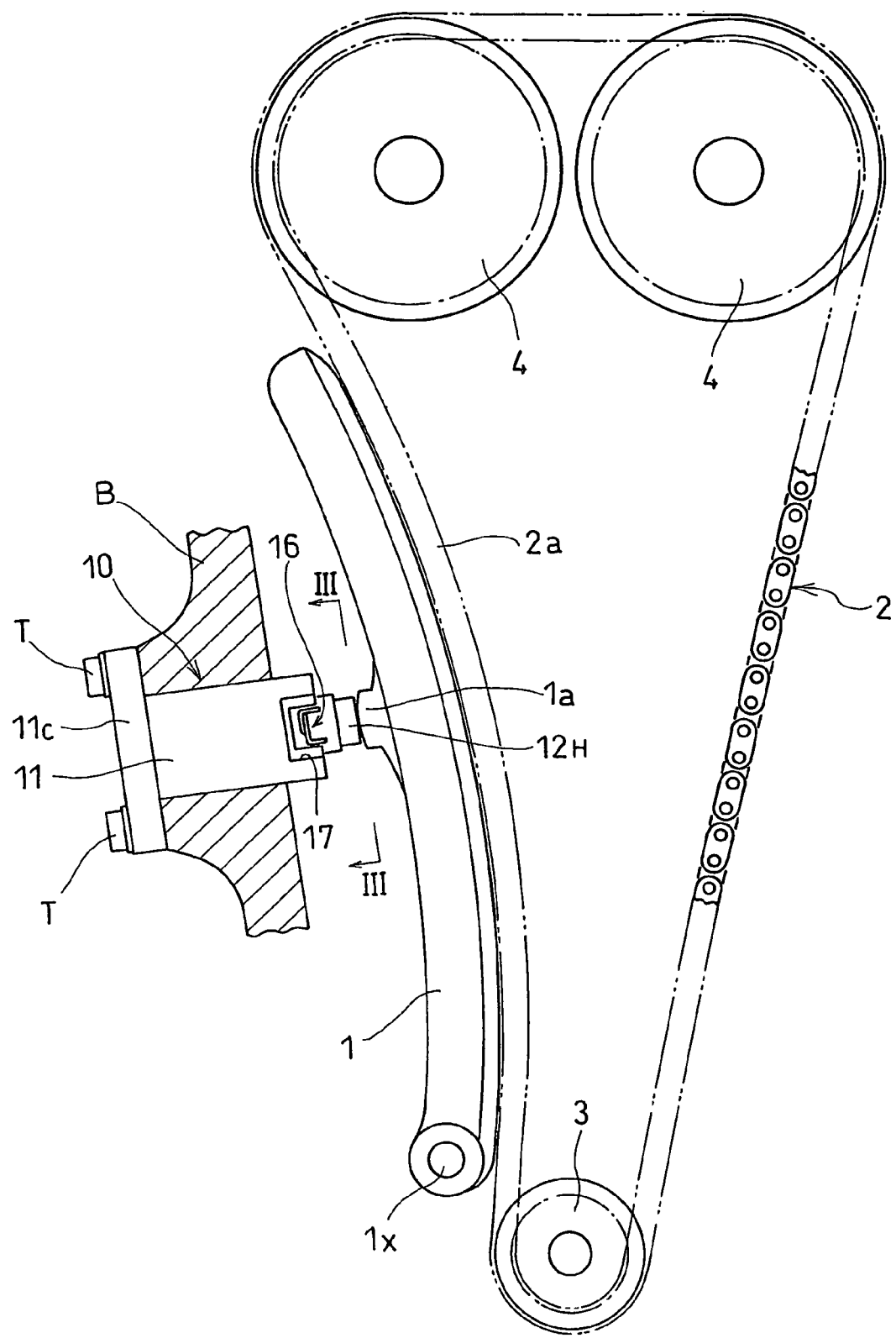
FIG. 1 shows an entire chain system including the chain tensioner according to the present invention.

Now, the embodiment of the invention is described with reference to the accompanying drawings. FIG. 1 is a schematic view of an entire chain system including the chain tensioner embodying the present invention. As shown, the chain tensioner 10 is held by mounting member B and includes a plunger 12 slidably mounted in a housing 11 having a base 11c secured to the mounting member B by mounting bolts T. The chain tensioner 10 has a head $12_H$ pressed against an abutting member 1a of a chain guide 1 pivotable about a shaft 1x. The plunger 12 thus presses the chain guide 1 against the slack side 2a of a camshaft driving chain 2, thereby applying tension to the chain 2. The chain 2 connects a pulley 3 on the engine output shaft to pulleys 4 on camshafts. Reference numeral 16 designates a retraction regulating mechanism including a register ring 16b for regulating retraction of the plunger. Numeral 17 designates a cutout.

Figure 2:
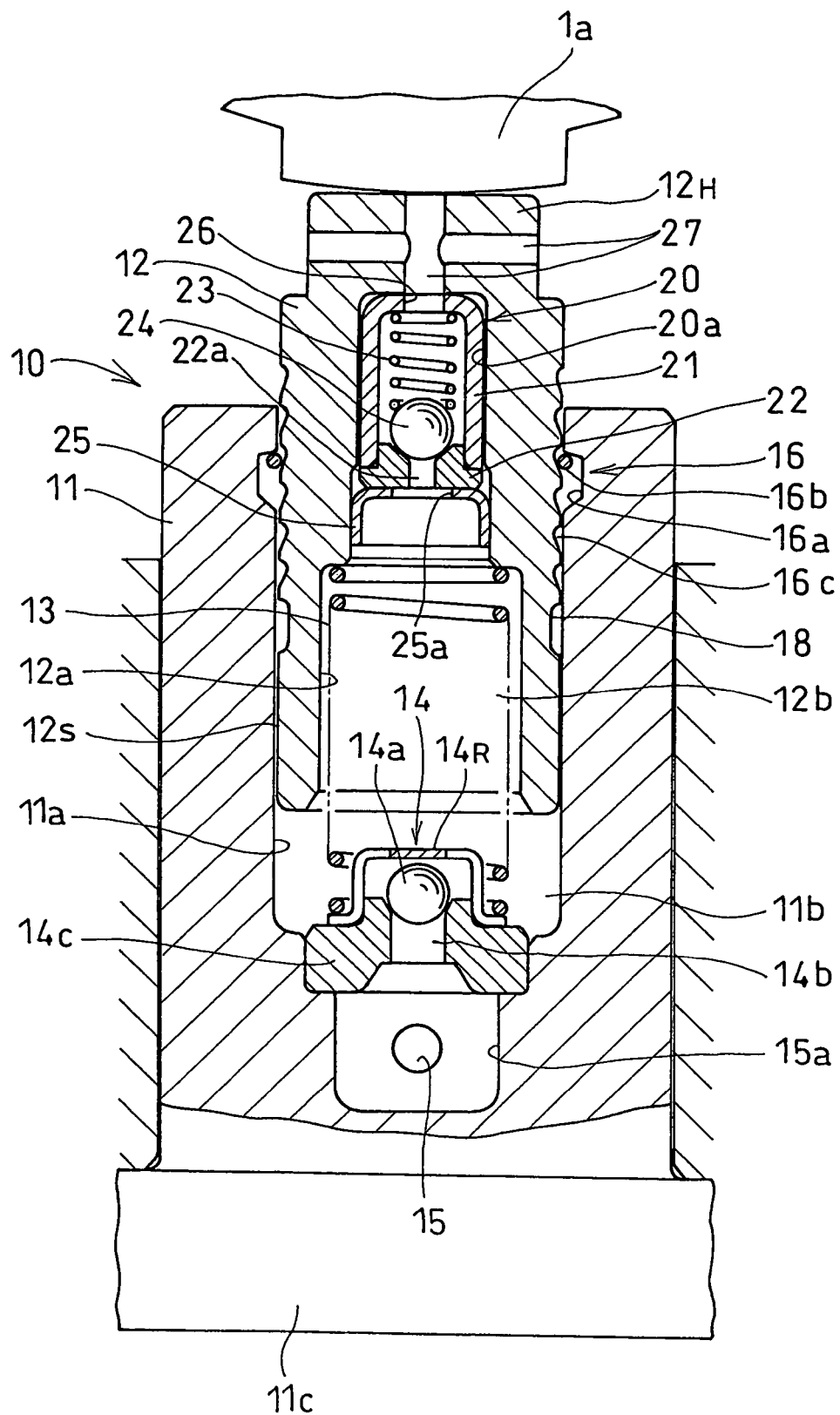
FIG. 2 is a partially cutaway side view of the chain tensioner of FIG. 1.
Figure 3:
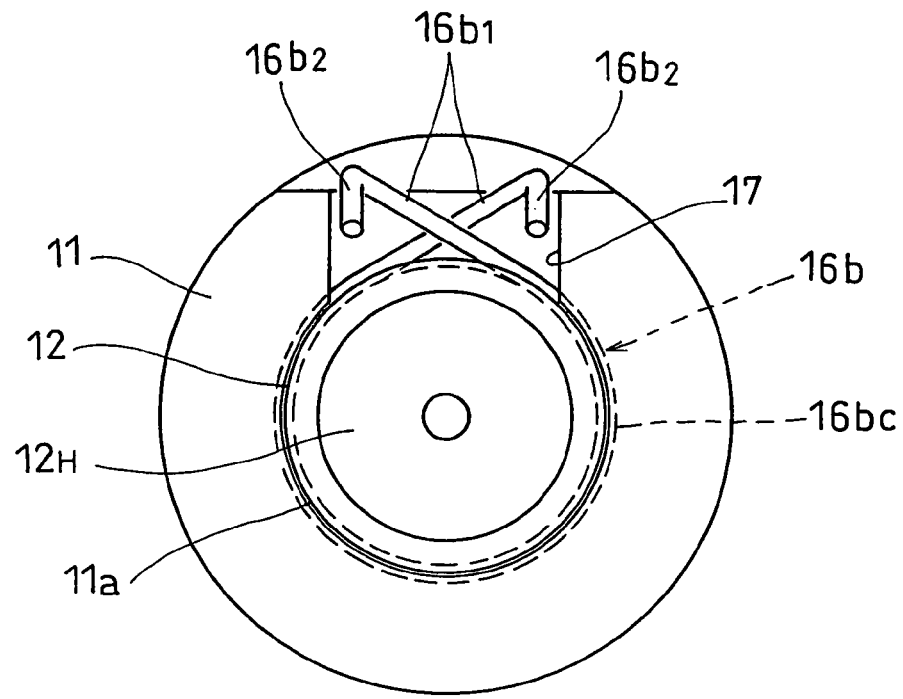
FIG. 3 is a front view of the chain tensioner of FIG. 1 taken along line III-III of FIG. 1.

As shown in FIG. 2, the chain tensioner 10 includes the housing 11, which is formed with a cylinder chamber 11a having an open end, the plunger 12, which is slidably received in the cylinder chamber 11a and formed with a bore 12a, a return spring 13 received in the bore 12a, a check valve 14 for preventing backflow of hydraulic fluid in a pressure chamber 11b (which is a portion of the cylinder chamber 11a remote from its open end) into a tank (not shown) through an oil supply passage 15, and a relief valve adapted to open if the pressure in a hydraulic damper chamber 12b, which is a portion of the bore 12a and communicating with the pressure chamber 11b, exceeds a predetermined pressure thereby discharging hydraulic fluid therethrough. The pressure in the cylinder chamber is thus kept constant.

The inner wall of the cylinder chamber 11a and the radially outer surface of the plunger 12 have diameters determined such that the clearance 12s defined therebetween, through which hydraulic fluid in the pressure chamber 11b can leak out, is of a predetermined size. The return spring 13 is mounted in a compressed state between the end wall of the bore 12a remote from its open end and the bottom wall of the cylinder chamber 11a, thereby resiliently biasing the plunger 12 axially outwardly of the housing 11. The check valve 14 includes a valve seat 14c formed with an oil passage 14b through which the pressure chamber 11b communicates with a chamber 15a communicating with the oil supply passage 15, and a check ball 14a adapted to close the top end of the oil passage 15 when the pressure in the pressure chamber 11b rises, thereby preventing backflow of the hydraulic oil in the pressure chamber 11b and move away from the valve seat 14c when the pressure in the pressure chamber 11b is low, thereby allowing hydraulic oil to be supplied into the pressure chamber 11b. The check valve 14 further includes a retainer 14R that restricts the movable distance of the check ball 14a.

On the inner circumference of the housing 11 near its open end, there is provided the retraction regulating mechanism 16 for regulating retraction (movement in the direction away from the chain 2a) of the plunger 12. The retraction regulating mechanism 16 comprises an annular groove 16a formed in the inner wall of the cylinder chamber 11a near its open end, the register ring 16b having a radially resiliently deformable C-shaped ring portion 16bc received in the annular groove 16a, and a plurality of axially equidistantly spaced apart annular grooves 16c formed in the radially outer surface of the plunger 12. Each annular groove 16c comprises a tapered surface of which the diameter decreases gradually in the axial direction of the plunger from the rear end (end remote from the chain) of the groove 16c, and an engaging surface extending from the small-diameter end of the tapered surface to the front end of the groove 16c. The register ring 16b comprises the C-shaped ring portion 16bc and two rods $16b_1$ extending from both ends of the C-shaped ring portion 16bc so as to cross each other. The rods $16b_1$ have bent ends $16b_2$ disposed in the cutout 17. By holding the bent ends $16b_2$, the ring portion 16bc can be expanded. The ring portion 16bc is normally tightly wrapped around one of the annular grooves 16c.

Figure 4:
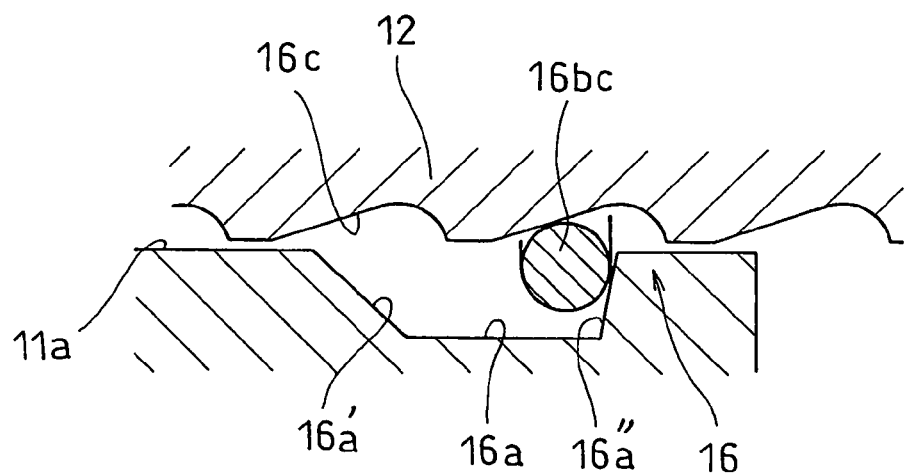
FIG. 4 is a partial enlarged sectional view of the chain tensioner of FIG. 1.

When the plunger 12 is pushed outwardly under a sufficiently large force, the plunger 12 will be allowed to move forward (toward the chain 1a). When the plunger 12 moves forward, the ring portion 16bc of the register ring 16b will move axially leftwardly in FIG. 4 (downwardly in FIG. 2) relative to the plunger along the tapered surface of one of the annular grooves 16c while radially expanding. Conversely, when the plunger is pushed in the direction away from the chain 1a, the ring portion 16bc will get stuck between the rear tapered surface 16a' of the annular groove 16a and the tapered surface of one of the annular grooves 16c, thereby preventing any further retraction of the plunger. When the ring portion 16bc is in the smallest-diameter portion of any of the annular grooves 16c, its outer diameter is greater than the diameter of the cylinder chamber 11a. Thus, when the plunger 12 advances, the ring portion 16bc will abut the front wall 16a" of the annular groove 16a. This prevents separation of the register ring 16b. The plunger 12 is further formed with a safety groove 18 to receive the register ring 16b when the plunger is sufficiently advanced to thereby limit further advancement of the plunger 12, thereby preventing the plunger 12 from coming out of the cylinder chamber 11a.

A relief valve 20 is mounted in a valve chamber 20a formed in the plunger 12 so as to be positioned nearer to the protruding end of the plunger 12 than is the bore 12a while communicating with the bore 12a. The valve chamber 20a comprises a small-diameter portion and a large-diameter portion. The relief valve 20 comprises a sleeve 21 having an end wall and an open end and received in the small-diameter portion of the valve chamber 20a, a valve seat 22 pressed into the open end of the sleeve 21, and a spring 23 and a valve ball 24 mounted in the sleeve 21. A cup member 25 is pressed into the large-diameter portion of the valve chamber 20a to hold the relief valve 20 in the small-diameter portion of the valve chamber 20a. The cup member 25 has its open end facing the hydraulic damper chamber 12b and is formed with an oil discharge hole 25a in its end wall. The oil discharge port 25a communicates with a flow passage 22a formed in the valve seat 22. An oil discharge hole 26 is formed in the end wall of the sleeve 21 which communicates with an oil discharge passage 27 having a cross-shaped section and formed in the portion of the plunger between its protruding end and the hydraulic damper chamber 12b. The spring 23 is mounted in the sleeve 21 in a compressed state between the end wall of the sleeve 21 and the valve ball 24 to always urge the valve ball 24 against the valve seat with a predetermined constant spring force. With this arrangement, if the pressure in the hydraulic damper chamber 12b rises above a predetermined value determined by the spring force of the spring 23, the relief valve 20 will open.

According to the present invention, the pressure in the hydraulic damper chamber 12b above which the relief valve 20 opens, and the radial dimension of the clearance 12s between the radially outer surface of the plunger and the radially inner wall of the cylinder chamber, through which hydraulic oil leaks out, are set to predetermined ranges with reference to each other such that the tension in the chain is kept at such a level that the vibration of the chain is minimum within a wide range of oil temperatures (e.g. between −40 to 140 degrees C.) and within a wide range of engine speeds (e.g. 900 to 18000 rpm in case of a four-cylinder engine; which corresponds to a chain vibration frequency of 30 to 600 Hz).

Specifically, the pressure in the hydraulic damper chamber above which the relief valve opens is determined within a range of 0.3 to 1.5 MPa, preferably 0.4 to 1.0 MPa. (This pressure is hereinafter referred to as "relief pressure".)

The radial dimension of the clearance 12s between the radially outer surface of the plunger and the radially inner wall of the cylinder chamber, through which hydraulic oil leaks out, is determined within a range of 0.03 to 0.12 mm, preferably 0.05 to 0.09 mm. (This clearance is hereinafter referred to as "oil leakage clearance".)

By determining the relief pressure within the above range, the pressure in the hydraulic damper chamber 12b is always kept at a level equal to or lower than the relief pressure. This prevents the tension in the chain from exceeding a predetermined level. If the oil leakage clearance is too large, hydraulic oil tends to leak through the oil leakage clearance in too large an amount while the oil temperature is high and/or the engine rpm is low, thereby excessively reducing the reaction force of the tensioner, which will in turn cause excessive flapping of the chain. Conversely, if the oil leakage clearance is too small, even after the relief valve has opened, the pressure in the hydraulic damper chamber frequently increases, thereby increasing the tension in the chain to an excessively high level.

By further determining the movable distance of the check ball 14a of the check valve 14 within a range of 0.1 to 0.6 mm, preferably 0.2 to 0.5 mm, the tension in the chain can be more reliably kept at such a level that vibrations of the chain are minimum.

If the movable distance of the check ball is below the above range, the plunger will be unable to sufficiently quickly protrude following the slackening chain because hydraulic oil cannot be supplied into the cylinder chamber at a sufficiently high rate. This causes excessive flapping of the chain. If the movable distance of the check ball is higher than the above range, the check valve 14 cannot be closed sufficiently quickly when the plunger is pushed into the housing by the chain. This increases the stroke of the plunger and thus flapping of the chain.

Now in operation, the return spring 13 biases the plunger 12 outwardly of the housing to press the head $12_H$ of the plunger 12 against the chain guide 1, which is pivotable about the shaft 1x, thereby pressing the guide 1 against the cam driving chain 2. The tension in the chain 2 is thus kept constant. In this state, when the chain 2 vibrates and slackens due to fluctuations in the angular velocity and/or torque of the crankshaft, the return spring 13 will push the plunger 12 outwardly, thereby re-tensioning the chain 2. When the chain 2 is stretched to a predetermined degree and as a result, the chain begins to flap rather violently, the plunger 12 will advance until the ring portion 16bc of the register ring 16b moves along the tapered surface of one of the annular grooves 16c in which the ring portion 16 is received while being radially expanded, and gets into the rear adjacent annular groove 16c. This increases the length of the portion of the plunger 12 protruding from the housing, thus making it possible to apply suitable tension to the chain 2 even after it has been stretched.

When the tension in the chain 2 increases, force tending to push the plunger 12 into the housing acts on the hydraulic oil in the pressure chamber 11b, thereby increasing the hydraulic pressure in the pressure chamber 11b. When the pressure in the pressure chamber 11b exceeds the relief pressure, the relief valve 20 opens. Hydraulic fluid in the pressure chamber 11b (and the hydraulic damper chamber 12b) is thus discharged through the flow passage 22a, sleeve 2 1, oil discharge port 26 and oil discharge port 27. This prevents excessive increase in the tension of the chain, which in turn minimizes wear of the chain 2 and noise from the chain 2.

Simply by individually and independently determining the relief pressure of the relief valve and the radial dimension of the oil leakage clearance, it is difficult to always keep the tension in the chain in such a range that its vibrations are minimum, especially if the chain is used for an engine that is rotated at a high speed such as a two-wheeled vehicle engine. According to the present invention, in order to always keep the tension in the chain in such a range that its vibrations are minimum, the relief pressure of the relief valve and the radial dimension of the oil leakage clearance 12s are determined to predetermined ranges with reference to each other such that the tension in the chain is kept at such a level that the vibration of the chain is minimum at any oil temperature and at any moving speed of the chain, even if the chain is used for an engine that is rotated at a high speed such as a two-wheeled vehicle engine.

Figure 5A:
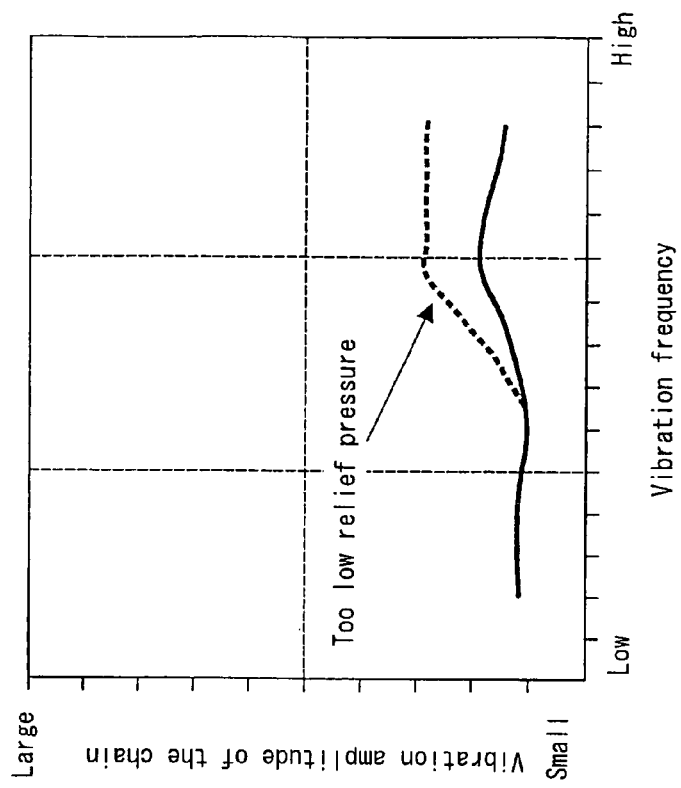
FIG. 5A is a graph showing the relationship between the tension in the chain and the vibration frequency of the chain at different relief pressures.
Figure 5B:
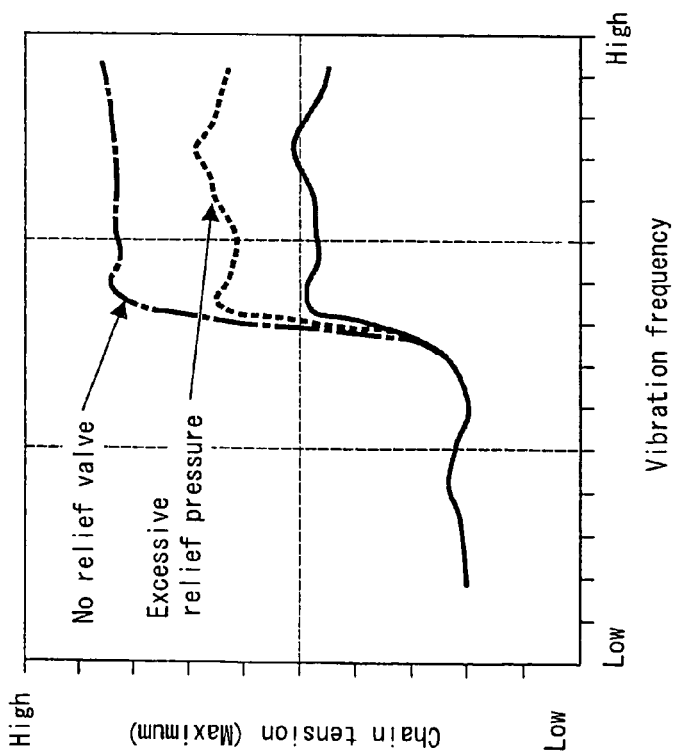
FIG. 5B is a graph showing the relationship between the vibration amplitude and vibration frequency of the chain at different relief pressures.

By suitably determining the relief pressure of the relief valve and the radial dimension of the oil leakage clearance, the tension in the chain can be kept in a suitable range, as shown in FIGS. 5A, 5B, 6A and 6B. FIG. 5A is a graph showing the relationship between the (maximum) tension in the chain and the oscillation frequency of the chain when no relief valve is provided (one-dot chain line), when the relief pressure is too high (chain line) and when the relief pressure is suitable (solid line). FIG. 5B is a graph showing the relationship between the oscillation amplitude and oscillation frequency of the chain when the relief pressure is too small (chain line) and when the relief pressure is suitable (solid line). FIGS. 5A and 5B show that the tension in the chain is kept at a suitable level (not too low and not too high) and its oscillation amplitude is also kept at a suitable level (i.e. small) by determining the relief pressure of the relief valve at a suitable level.

Figure 6A:
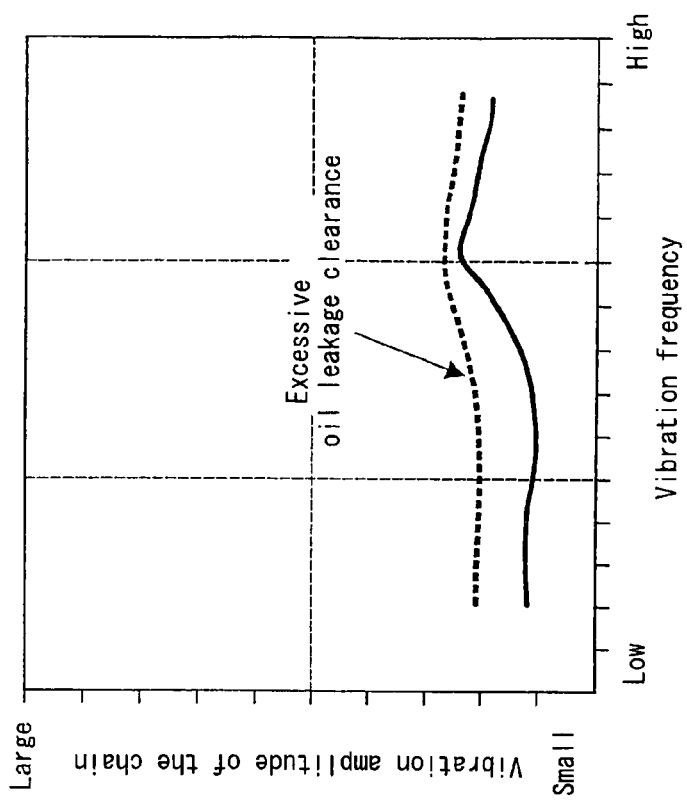
FIG. 6A is a graph showing the relationship between the tension in the chain and the vibration frequency of the chain at different radial dimensions of the oil leakage clearance.
Figure 6B:
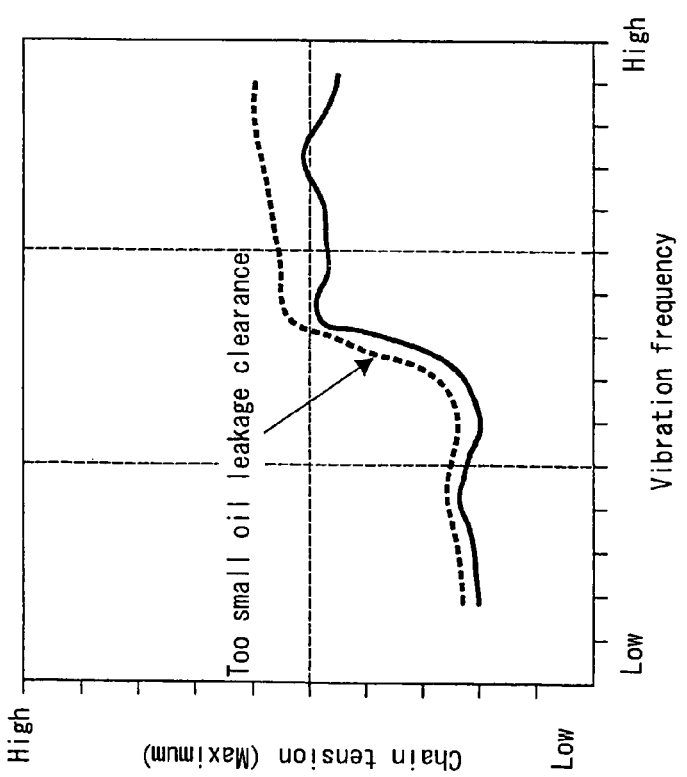
FIG. 6B is a graph showing the relationship between the vibration amplitude and vibration frequency of the chain at different radial dimensions of the oil leakage clearance.

FIG. 6A is a graph showing the relationship between the (maximum) tension in the chain and the oscillation frequency of the chain when the radial dimension of the oil leakage clearance is too small (chain line) and is suitable (solid line). FIG. 6B is a graph showing the relationship between the oscillation amplitude and oscillation frequency of the chain when the radial dimension of the oil leakage clearance is too large (chain line) and is suitable (solid line). FIGS. 6A and 6B show that the tension in the chain is kept at a suitable level (not too low and not too high) and its oscillation amplitude is also kept at a suitable level (i.e. small) by determining the radial dimension of the oil leakage clearance at a suitable level.

Figure 7:
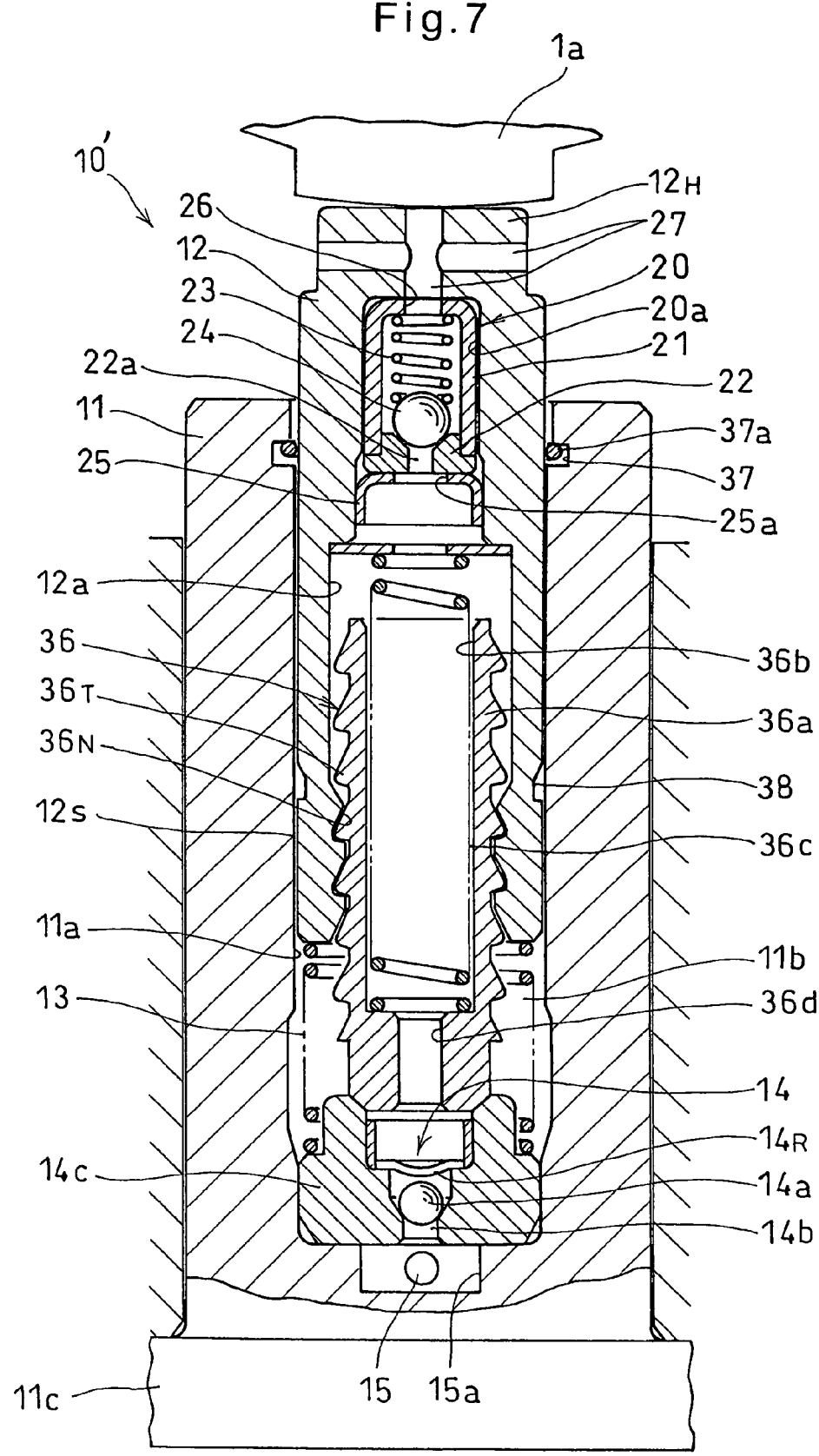
FIG. 7 is a partially cutaway side view of a chain tensioner according a second embodiment of the present invention.

FIG. 7 shows the chain tensioner 10' of the second embodiment. In this embodiment, a retraction regulating mechanism 36 that is different from the retraction regulating mechanism 16 of the first embodiment is used. The retraction regulating mechanism 36 comprises a screw rod 36a inserted in the bore 12a of the plunger 12 with its external thread $36_T$ in engagement with an internal thread $36_N$ formed on the inner wall of the bore 12a near its open end, and a spring 36c received in a bore 36b formed in the screw rod 36a with one end thereof supported on the end wall of the bore 12a and the other end supported on the end wall of the bore 36b, thereby biasing the screw rod 36a and the plunger 12 away from each other. The screw rod 36a has an oil passage 36d formed therein.

The internal thread $36_N$ and the external thread $36_T$ each comprise a pressure flank configured to engage the pressure flank of the other of the threads $36_N$ and $36_T$ when the plunger 12 is axially pushed into the housing 11, and a clearance flank having a smaller flank angle than the pressure flank. Thus, the threads $36_N$ and $36_T$ have a serration-shaped axial section. Also, the threads $36_N$ and $36_T$ have such a lead angle that the screw rod 36a can rotate and move axially toward the end wall of the cylinder chamber 11a under the force of the spring 36c. When the engine is stopped, according to the positions of the cams, the chain may stop in a tensioned state, thereby applying static pushing force to the plunger through the chain guide 1. Under this pushing force, the pressure flanks of the threads $36_N$ and $36_T$ are pressed against each other. In this state, since the pressure flanks have a sufficiently large flank angle, the plunger 12 cannot rotate relative to the screw rod 36a. Thus, the plunger 12 will not retract into the housing 11, thereby keeping the chain in a tensioned state.

An elastic ring 37a is fitted in a groove 37 formed in the inner wall of the cylinder chamber 11a near its open end in a radially expanded state. The plunger 12 is formed with a groove 38 in its radially outer surface near its rear end. The groove 38 has its front side tapered. The groove 38 has such a radial dimension that with the ring 37a fitted in the groove 38, the outer diameter of the ring 37a is greater than the diameter of the inner wall of the cylinder chamber 11a and will therefore prevent further advancement of the plunger 12 so as to prevent the plunger 12 from coming out of the cylinder chamber 11a.

While not shown, the relief valve 20 may be provided in a thick portion of the peripheral wall of the housing 11 near its closed end so as to be perpendicular to the axis of the plunger 12 and communicate with the pressure chamber 11b.

Since the chain tension according to the present invention can keep the tension in the chain at an optimum level at any temperature range and at any revolving speed of the engine, it can be especially suitable for use as a chain tensioner in a chain system for driving camshafts of a two-wheeled vehicle engine.

What is claimed is:

1. A chain tensioner assembly for a two-wheeled vehicle engine, comprising a chain tensioner for use in tensioning a chain of the engine, and a mounting member, said chain tensioner comprising:

a housing having an open front end and a radially inner surface defining a cylinder chamber, said housing having a base secured to said mounting member by mounting bolts;

a plunger having a radially outer surface and slidably mounted in said cylinder chamber, thereby defining a pressure chamber in said cylinder chamber, said radially inner surface and said radially outer surface defining a clearance therebetween through which hydraulic oil in said pressure chamber can leak, wherein said plunger has a bore communicating with said pressure chamber, and an oil discharge passage communicating with said bore and leading to the outside of said housing;

a retraction regulating mechanism provided between said housing and said plunger for restricting the distance by which said plunger retracts;

a spring biasing said plunger outwardly of said cylinder chamber, said housing being formed with a hydraulic oil supply passage communicating with said pressure chamber;

a check valve for preventing backflow of hydraulic oil in said pressure chamber into said hydraulic oil supply passage; and a relief valve mounted in said bore of said plunger for discharging hydraulic oil in said pressure chamber into said oil discharge passage when the pressure of hydraulic oil in said pressure chamber exceeds a predetermined relief pressure, said predetermined relief pressure and a radial dimension of said clearance being determined with reference to each other such that the tension in the chain, against which one end of said plunger protruding from said cylinder chamber is to be pressed, is kept at such a level that vibrations of the chain are minimum at any temperature of hydraulic oil and at any revolving speed of the engine;

wherein said retraction regulating mechanism comprises an internal thread formed on a radially inner surface of said plunger, a screw rod having an external thread formed on a radially outer surface thereof and engaging said internal thread and including a bore, and a spring inserted in said bore of said screw rod for axially biasing said plunger, said internal thread and said external thread each comprising a pressure flank configured to engage the pressure flank of the other of said internal and external threads when said plunger is axially pushed into said housing, and a clearance flank having a smaller flank angle than said pressure flank, whereby said threads have a serration-shaped axial section, said internal and external threads having such a lead angle that said screw rod can rotate and move axially rearwardly under the force of said spring inserted in said bore of said screw rod;

wherein a first groove is formed in said radially inner surface of said housing near the open front end thereof, and an elastic ring is received in said first groove in a radially expanded state;

wherein a second groove is formed in said radially outer surface of said plunger near a rear end thereof, said second groove being configured such that, when said plunger advances sufficiently to cause said elastic ring to enter said second groove, said plunger is prevented from advancing further, so that said plunger is prevented from coming out of said cylinder chamber; and wherein said relief pressure is determined within a range of 0.3 to 1.5 MPa, and said radial dimension of said clearance is determined within a range of 0.03 to 0.12 mm.

2. The chain tensioner assembly of claim 1 wherein said check valve comprises a valve seat and a check ball which is movable into and out of contact with said valve seat by a predetermined distance which is determined so as to maintain tension in the chain at such a level that vibrations of the chain are minimum at any temperature of hydraulic oil and at any revolving speed of the engine.

3. The chain tensioner assembly of claim 2 wherein said check valve further includes a check ball movement restricting member for restricting said predetermined distance to 0.1 to 0.6 mm.

* * * * *